US008495203B1

(12) United States Patent
Casati et al.

(10) Patent No.: US 8,495,203 B1
(45) Date of Patent: Jul. 23, 2013

(54) DISCOVERING AND MODELING SERVICE PROTOCOLS

(75) Inventors: Fabio Casati, Palo Alto, CA (US); Hamid Reza Motahari Nezhad, Palo Alto, CA (US); Boualem Benatallah, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2089 days.

(21) Appl. No.: 11/469,867

(22) Filed: Sep. 3, 2006

(51) Int. Cl.
*G06F 15/173* (2006.01)
*G06F 15/16* (2006.01)

(52) U.S. Cl.
USPC ............................ 709/224; 709/229; 709/230

(58) Field of Classification Search
USPC .......................................... 709/224, 229, 230
See application file for complete search history.

(56) References Cited

U.S. PATENT DOCUMENTS

| | | | | |
|---|---|---|---|---|
| 7,222,121 | B2 * | 5/2007 | Casati et al. ........................... | 1/1 |
| 8,265,925 | B2 * | 9/2012 | Aarskog ............................ | 704/9 |
| 2003/0204581 | A1 * | 10/2003 | Adar et al. ..................... | 709/223 |
| 2004/0103076 | A1 * | 5/2004 | Casati et al. ....................... | 707/1 |
| 2004/0103186 | A1 * | 5/2004 | Casati et al. ................... | 709/224 |
| 2005/0080661 | A1 * | 4/2005 | Casati et al. ..................... | 705/10 |
| 2005/0172027 | A1 * | 8/2005 | Castellanos et al. .......... | 709/229 |
| 2006/0235742 | A1 * | 10/2006 | Castellanos et al. ............ | 705/10 |

OTHER PUBLICATIONS

J. E. Cook, A.L. Wolf "Discovering Models of Software Processes from Event-Based Data", published in "ACM Transactions on Software Engineering and Methodology", vol. 7, No. 3, Jul. 1998, pp. 215-249.*
S. Dustdar, R. Gombotz, and K. Baina, "Services interaction mining," Technical Report TUV-1841-2004-16, Technical University of Vienna, Sep. 2004.
J. E. Cook and A. L. Wolf, "Discovering models of software processes from event-based data," ACM TOSEM, 7(3):215-249, 1998.

* cited by examiner

*Primary Examiner* — David Lazaro
*Assistant Examiner* — Vitali Korobov

(57) ABSTRACT

Provided are systems, methods and techniques for discovering protocols of a network-provided service by initially collecting interaction data that pertain to messages between a plurality of devices across a network. Metrics that indicate frequencies of occurrence for different message sequences within the interaction data are calculated, and a protocol structure based on the interaction data and the metrics is generated. Finally, the protocol structure, which describes permitted conversations for a particular service implemented across the network, is output.

20 Claims, 10 Drawing Sheets

DISCOVERING AND MODELING SERVICE PROTOCOLS

FIELD OF THE INVENTION

The present invention pertains to systems, methods and techniques for discovering the automated protocols used by network-provided services, and also pertains to structures for modeling such services.

BACKGROUND

Traditionally, descriptions of Web services have focused primarily on the interfaces that are provided by such services. However, a trend that is gathering momentum is to include, as part of the Web Services Description Language (WSDL), not only the service interface, but also the business protocol supported by the service, i.e., the definition of the ordering constraints on the message exchanges that are allowed by the service, e.g., in interacting with other services. Unfortunately, obtaining a formalized definition of a supported business protocol often is very difficult and time-consuming.

DESCRIPTION OF THE PREFERRED EMBODIMENT(S)

Figure 1:
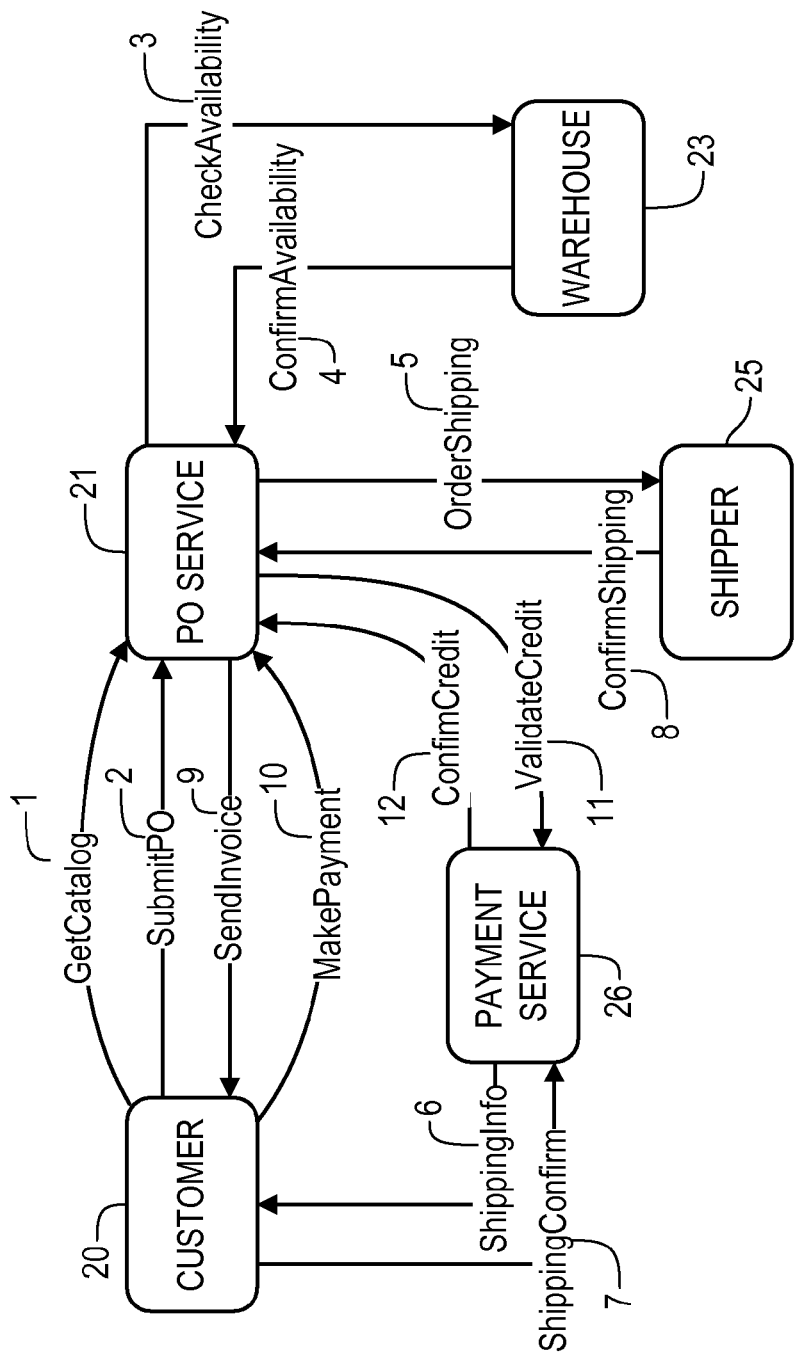
FIG. 1 illustrates a block diagram of a portion of supply-chain-management communications, according to a representative embodiment of the present invention.

Modeling business protocols brings several benefits to Web services. For example: (i) it often provides developers with useful information on how to develop clients that can correctly interact with a service or a set of services, (ii) it can allow the middleware to verify that messages are sent and received in accordance with the protocol specifications, thereby relieving the developers from implementing certain exception handling logic, and (iii) it can allow the middleware to determine if a service is compatible, is replaceable with another service, or conforms to a certain standard, thereby supporting both service development and binding.

The present invention presents, among other things, a set of concepts and techniques for discovering business protocols from conversation logs. A conversation is the sequence of message exchanges among two or more services.

The protocol discovery techniques of the present invention have applications, for example, in connection with the following aspects of Web services:

1. Protocol definition: The techniques of the present invention can allow one to derive the protocol definition in the event that the developer has not given an explicit protocol model. This can happen for many reasons. For example, it can occur where the service has been developed using the bottom-up approach, e.g., by simply transforming an existing application into Simple Object Access Protocol (SOAP), which is a very common case in practice, or where the developer has not explicitly or adequately documented the protocol. The latter situation also is common, especially when development is time-pressured, and therefore the documentation and the exception-handling logic are left until the end of the process.

2. Discovering cross-service protocols: Sometimes it is helpful to determine protocols that span across Web services. In one example, to process a purchase order, a seller service talks to a credit-verification service and then to a shipper service. If these are separate Web services, it is possible to determine that the seller often uses them together and that the overall interaction obeys a certain protocol. Discovering such a protocol is like recognizing the existence of a business protocol for the seller service that spans across multiple of its partners. The global business protocol spanning over the interactions of all interacting services (e.g., for a supply-chain scenario) is called the choreography of services. Modeling protocols makes it easier to monitor, manage, and evolve services, as development tools then can ensure that new versions of services conform to the overall protocol.

3. Discovering typical access behavior of clients to a service: It is possible to observe that clients only use a subset of the conversations allowed by the protocol of a service. In this case, it often is beneficial to capture these usage scenarios to better tailor a service, or to remove the unnecessary protocol logic to avoid future development and maintenance efforts to support conversations that are never or rarely carried out.

4. Protocol verification: This involves verifying if the modeled protocol corresponds to the actual protocol. An instance of this problem involves discovering if the service is compliant with a standard protocol specification.

The following discussion first describes the characteristics of the protocol-discovery problem. Then, certain specific techniques for its solution are presented.

Discussion of Selected Underlying Concepts

In order to illustrate certain concepts related to protocol discovery for Web services, a supply-chain management scenario, as illustrated in part in FIG. 1, is used as an example. In this example, customers 20 send orders 2 to a purchase order (PO) management service 21 to buy goods. The PO Service 21 interacts with a Warehouse 23, a Shipper 25, and a Payment Service 26.

According to certain representative embodiments of the present invention, protocol discovery from conversation logs considers the following aspects, in addition to the discovery technique: (i) scope of the discovery problem, (ii) definition of a model for discovered protocols, (iii) characteristics and limitations of conversation logs, and (iv) message correlation. In the following discussion, each of these considerations is briefly discussed, and then the remainder of the discussion primarily focuses on the discovery technique.

Protocol discovery can be performed from the perspective of a service provider, a service requester, or as a middleware service. Considering these different possibilities, one can discover any of the following models:

1. The protocol model of a given service in interactions with another specific service or type of service (also called bi-party protocol). For example, referring to FIG. 1, one may want to discover the protocol of the PO Service 21 when interacting with its customers 20 (e.g., using messages 1, 2, 9 and 10, as shown in FIG. 1).

2. The protocol of a given service when interacting with many or all of its partners. An example, again referring to FIG. 1, is the overall protocol supported by the PO service 21, which will involve interactions with the Customer 20, Warehouse 23, the Shipper 25, and the Payment Service 26 (using messages 1-5 and 8-12, as shown in FIG. 1). This model is referred to herein as the service-specific projection (or view) of a choreography.

3. The entire choreography, including all interactions among multiple services. For example, referring to FIG. 1, the choreography includes all partner services shown FIG. 1, e.g., using messages 1-12.

The focus of the present invention is on the protocol discovery problem generally, and may be applied to any of the foregoing models.

In the preferred embodiments of the invention, one goal of a discovered protocol (DP) is to give service developers an understanding of what the implemented protocol behavior is and to facilitate (and possibly fully automate) the definition of the protocol associated with one or more services. Defining a formalism for DPs preferably involves all the issues of the formalisms for protocols and more. For example, the defined formalism preferably is simple enough so that it is easy to understand, powerful enough to express at least the most commonly needed behaviors, and formal enough to allow automated processing by service development and management tools. In addition, the present inventors have discovered that it generally is desirable that the discovered protocol conveys: (i) an indication of its own accuracy (i.e., the level of confidence in the obtained result), and (ii) the portions of the DP for which two or more possible alternative paths (or "configurations") have been discovered.

The protocol formalism preferably is based on deterministic finite state machines (FSMs). A FSM representation is a well-known paradigm, easy to understand and formalize, and suitable for modeling reactive behaviors. FSMs also have an explicit notion of state, which is useful for monitoring service executions. Furthermore, there are a number of existing methods and tools, some developed by the present inventors, that enable analysis and management of protocol models specified via FSMs.

In a protocol model, states represent the different phases that a service may go through during its interactions with a client. Each state preferably is labeled with a logical name, such as "PO Submitted". A protocol model has one initial state and a set of final states. Arcs between states preferably are labeled with brief descriptions of the messages that cause the corresponding transitions, i.e., with the meaning that state transitions occur when the corresponding message is sent by the client to the server (or vice versa).

Without loss of generality, it is assumed that there are no conflicts with message names, e.g., messages sent by the client have different names than those sent by the provider. A "conversation" corresponds to a possible instantiation of the protocol model, i.e., a path (or set of transitions) in the FSM resulting in a sequence of messages from the initial state to a final state. When a conversation is in a given state, only messages that are labels of arcs input to or output from that state can be validly received or sent. Hence, the state machine defines the set of allowed conversations. In the preferred embodiments of the invention, one goal is to identify the set of permitted conversations that can occur with an automated network-implemented service agent (i.e., those conversations that are supported by the protocols and processes that have been defined for the automated agent) and to represent that discovered set of permitted conversations using a formatted structure.

It is noted that whether incoming arcs correspond to messages that can be validly sent or messages that can be validly received and, correspondingly, whether outgoing arcs correspond to messages that can be validly received or messages that can be validly sent, respectively, depends upon the perspective from which one is viewing the protocol model. Transmission or receipt of an invalid message preferably simply triggers an error message in response.

A business protocol according to the preferred embodiments of the present invention formally is defined as a tuple $P=(S, s_0, F, M, T)$, where S is the set of states of the protocol, M is the set of messages supported by the service, $T \subset S^2 \times M$ is the set of transitions, $s_0$ is the initial state, and F represents the finite set of final states. A transition from state s to state s' triggered by the message m is denoted by the triplet (s, s', m).

For a protocol model to be valid, all states must be reachable from the initial state $s_0$. Furthermore, for every state s, there is at most one target state s' where the service can transition after receiving/sending a given message m. Allowing multiple target states after a given operation invocation would make protocols ambiguous, as it would be impossible for clients, by looking at the message exchange, to know the conversation state, and hence which messages can be sent or received next, thereby essentially nullifying the benefits of protocol modeling.

Figure 2:
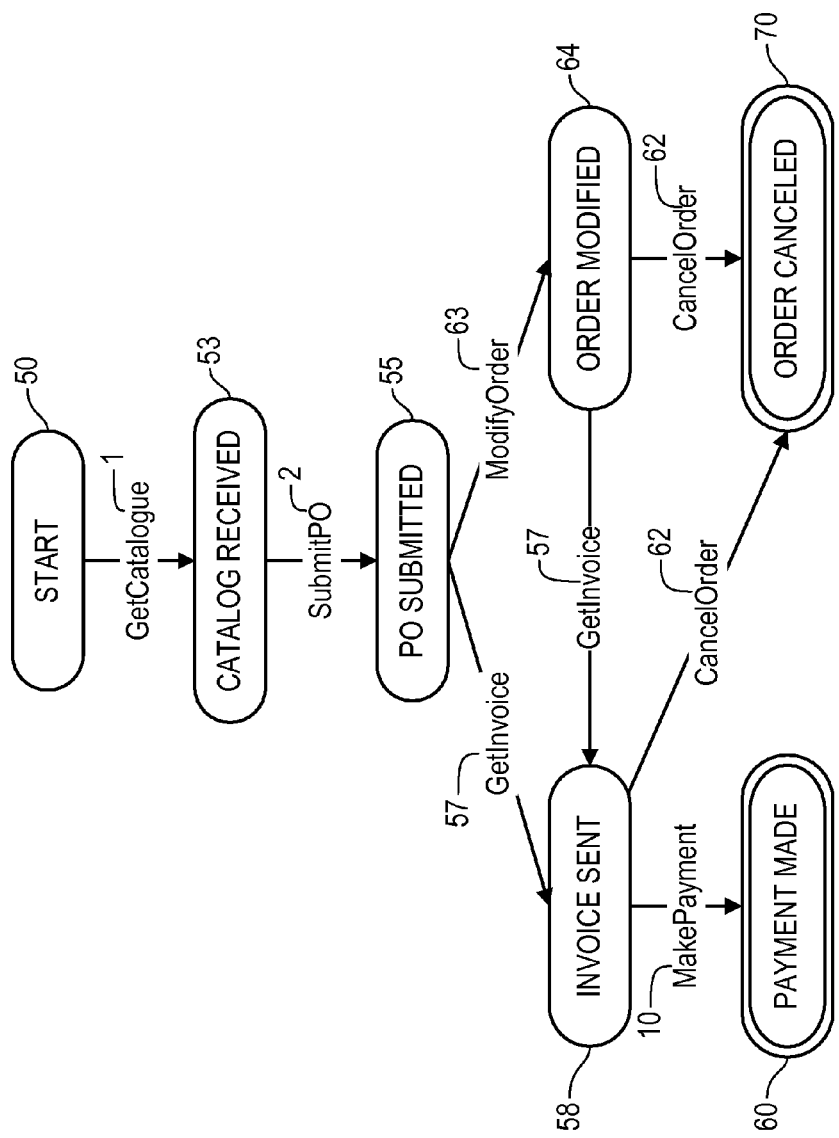
FIG. 2 depicts the business protocol supported by a purchase-order service when interacting with its customers, according to a representative embodiment of the present invention.

FIG. 2 depicts the business protocol supported by the PO Service 21 (shown in FIG. 1) when interacting with its customers 20. From the initial state 50, PO Service 21 can process only a single incoming message, GetCatalog 1. Upon receiving that message, it performs some processing and then transitions to the next state, Catalog Received 53. From that state, PO Service 21 can validly process only a single incoming message, SubmitPO 2, causing it to perform some processing and then transition to state PO Submitted 55. From that state, PO Service 21 can validly process either of two different incoming messages, each causing it to transition to a different state.

From state PO Submitted 55, receipt of the message GetInvoice 57 causes PO Service 21 to perform some processing and then transition to state Invoice Sent 58. From there, PO Service 21 can validly process message MakePayment 10, in which case it performs some processing and then transitions to final state Payment Made 60, or can validly process message CancelOrder 62, in which case it performs different processing and then transitions to final state Order Canceled 70.

On the other hand, again beginning from state PO Submitted 55, receipt of the message ModifyOrder 63 causes PO Service 21 to perform some processing and then transition to state Order Modified 64. From there, PO Service 21 can validly process message GetInvoice 57, in which case it transitions to state Invoice Sent 58 (described above), or can validly process message CancelOrder 62, in which case it performs different processing and then transitions to final state Order Canceled 70.

As indicated above, the task of modeling formalisms for discovered protocols has extra requirements than when initially designing protocol models. For example, with respect to discovered protocols, the present inventors have discovered that it is highly desirable to provide the user with additional information (e.g., metadata) to convey the degree of certainty in a given part of the discovered protocol, or to indicate that some portions of the protocol might be imprecisely specified, i.e., where the discovery procedure was not able to specify it precisely. To meet these requirements, the present invention preferably extends the designed-protocol model as follows:

1. The present invention introduces a concept of a macrostate, which is not part of any designed-protocol model. Generally speaking, a macrostate encapsulates a subprotocol, in that it defines a sequence of message exchanges that can occur at some stage during the top-level protocol. It is somewhat analogous to a subprocess in the process-modeling domain. Subprotocols, like subprocesses, can be used as modularization units to facilitate design. However, the present invention instead primarily uses a macrostate to encapsulate a region of a protocol for which there is an amount of uncertainty regarding the exact configuration, and/or for which the discovery process returns different alternative protocol models.

2. The present invention preferably adds metadata to the designed-protocol model, as a set of properties and metrics associated with the elements of the discovered protocol model. More preferably, such metadata are provided at various levels of granularity. Such metadata preferably show the degree of certainty (or, correspondingly, uncertainty) with respect to some or all of the elements of the protocol model, and are intended mainly to assist protocol designers in refining the DP model. However, the metadata also may be used by process designers of client applications, e.g., (i) to flag areas of service-protocol uncertainty; (ii) to incorporate additional exception-handling logic when communicating within those uncertain portions of the discovered-protocol model; and/or (iii) to incorporate reporting logic in order to feed back communication information when the client application is within such uncertain portions of the discovered-protocol model, for the purpose of improving the discovered-protocol model.

As discussed above, a macrostate can be considered as a subprotocol, with some additional constraints on it. A macrostate preferably is defined as follows: $MS=(S', s_i, s_f, M', T')$ is a macrostate if it is such that:

1. $M' \subset M$, $S' \subset S$ and $T' \subset S'^2 \times M' \subset T$;
2. $\overline{MS}$ has a unique initial state $s_i \in \overline{S'}$ and a unique final state $s_f$; and
3. MS is closed with respect to S'; i.e. for any state of S', all its incoming transitions originate from a state in S' and all its outgoing transitions are directed to a state in S', with the exception of the macrostate's initial and final states; stated mathematically:

$$\forall (s_a, s_b, m) \in T, \begin{cases} s_a \in S', s_a \neq s_f' \Rightarrow s_b \in S' \\ s_b \in S', s_b \neq s_i' \Rightarrow s_a \in S' \end{cases}$$

Note also that according to this definition, the initial state of a macrostate has all its outgoing transitions directed to states of S' and the final state of the macrostate has all its incoming transitions originating from states of A'. A configuration of a macrostate is defined as a path, i.e., sequence of transitions, from the initial state $s_i$ to the final state $s_f$ of the macrostate. C(MS) is used to denote the set of configurations of macrostate MS. In general, macrostates can be nested, so that there are macrostates inside other macrostates.

Figure 5B:
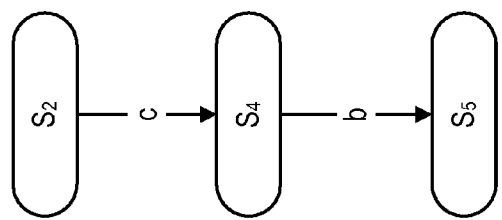
FIG. 5B illustrates another possible configuration of the same macrostate, according to a representative embodiment of the present invention.
Figure 5A:
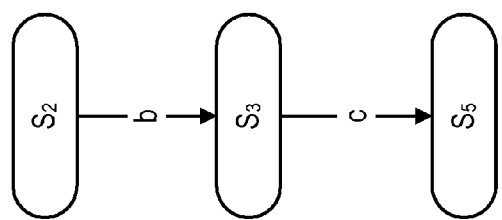
FIG. 5A illustrates one possible configuration of a macrostate.
Figure 4:
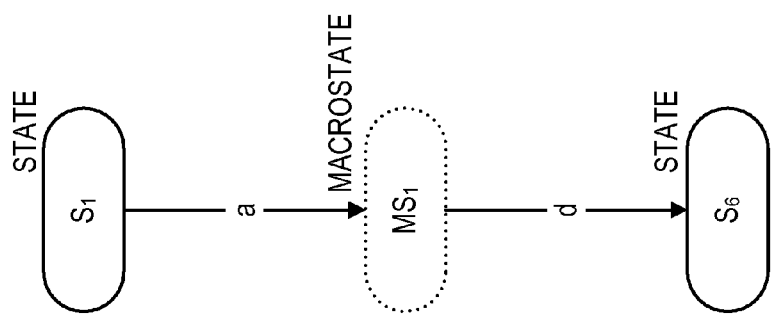
FIG. 4 illustrates a tentatively discovered portion of a business protocol, with an uncertain subportion of such protocol having been replaced by a macrostate, according to a representative embodiment of the present invention.
Figure 3:
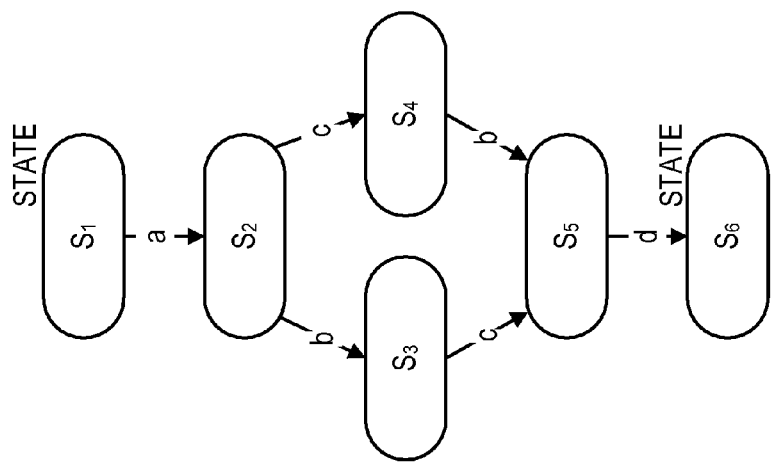
FIG. 3 illustrates a tentatively discovered portion of a business protocol according to a representative embodiment of the present invention.

An example is provided in FIG. 3, which illustrates a tentatively discovered portion of a business protocol according to a representative embodiment of the present invention. More specifically, the business protocol shown in FIG. 3 includes transitions $(s_1, s_2, a)$, $(s_2, s_3, b)$, $(s_3, s_5, c)$, $(s_2, s_4, c)$, $(s_4, s_5, b)$ and $(s_5, s_6, d)$. Suppose that each of transitions $(s_2, s_4, c)$, $(s_4, s_5, b)$, $(s_2, s_3, b)$ and $(s_3, s_5, c)$ has support in the collected data (resulting in a particular level of certainty) that is lower than a user-defined certainty threshold (which is discussed in more detail below). As illustrated in FIG. 3, there are two possible configurations from state $s_2$ to $s_5$. In this case, identifying whether the sequence bc, cb or both are possible depends on the semantics of the protocol and/or the nature of messages b and c. For instance, if b='SubmitPO' and c='SendInvoice', then only bc makes sense, but if b='GetCatalog' and c='CheckBalance' messages, then both sequences potentially make sense. In this case, all conditions of the macrostate definition are met, so these transitions are identified as being inside macrostate $MS_1$ (as illustrated in FIG. 4), and the decision-making about the actual configuration of such transitions generally is left to a domain expert that subsequently refines the model. This approach therefore can have the effect of hiding the details of imprecisely specified parts of the protocol, which may not be of interest to a developer, and provides an abstraction that permits a cleaner protocol model. The possible configurations of the macrostate $MS_1$ are sequences bc and cb, with the initial state $s_2$ and the final state $s_5$ (as shown in FIGS. 5A and 5B), and this information preferably is embedded within the representation of macrostate $MS_1$.

The provision of metadata often can provide more insight on the accuracy of the discovered model and allow designers to guide and refine the discovered protocol model or to define processes that communicate adequately within the context of the discovered uncertainty. Preferably, a number of metrics are defined, at four different levels: transition, state, macrostate, and protocol levels. As should be apparent from the discussion below, such metrics generally provide various indications of how frequently (or relatively frequently) different message sequences occur within the collected interaction data (sometimes referred to herein as "frequencies of occurrence").

Transition-Level Metrics.

Transition-level metrics include "support" and "confidence". The support of a transition t=(s,s',m), denoted by Supp(t), preferably is defined as the percentage of conversations in the log that take this transition in the protocol model, but instead could be defined as any other metric indicating the prevalence of the transition across conversations. The confidence of a transition t=(s, s', m), denoted by Conf(t), preferably is defined as the probability that transition t is taken among all other possible transitions from state s, but instead could be defined as any other metric indicating prevalence (e.g., relative prevalence) of a transition from a specified state. For example, in the preferred embodiment of the invention, referring to FIG. 2, the confidence of transition CancelOrder from "Invoice Sent" shows the probability of the service canceling an order after receiving an invoice. If there is only one outgoing transition, the confidence is 1. Transitions in the DP model preferably are classified as weak or strong based on whether their support value is below or above an uncertainty threshold, discussed in more detail below.

State-Level Metrics.

In preferred embodiments of the invention, the only metric associated with states is FinalStateSupport, which preferably is defined as the percentage of conversations that terminate in the state, but instead may be any other metric providing an indication as to whether a particular state is in fact a "final state". This metric is intended to be helpful in distinguishing real final states from other false-positive final state candidates, which may occur due to noisy or incomplete conversations. Final states with a support less than the uncertainty threshold preferably are considered as weak final states, for which the designer preferably needs to contribute to the decision if they are to be definitely identified as final states.

Macrostate-Level Metrics.

Metrics of support and confidence preferably also are defined for each configuration inside the macrostate. Support of a configuration preferably is defined as the percentage of conversations that obey the configuration, but instead may be defined as any other metric indicating the prevalence of the configuration across conversations. Confidence preferably is defined as the probability of occurrence of a given configuration in a conversation, among other possible configurations, but instead may be defined as any other metric indicating prevalence (e.g., relative prevalence) of a given configuration within a conversation, e.g., relative to other possible configurations.

Protocol-Level Metrics.

At the protocol-level, the Coverage metric, denoted by Cov(P), preferably expresses the percentage of conversations in the log that could be generated from the DP model, but instead could be defined as any other metric indicating how much of the actual protocol appears to have been modeled.

Exemplary Techniques for Generating a Protocol Structure.

Figure 6:
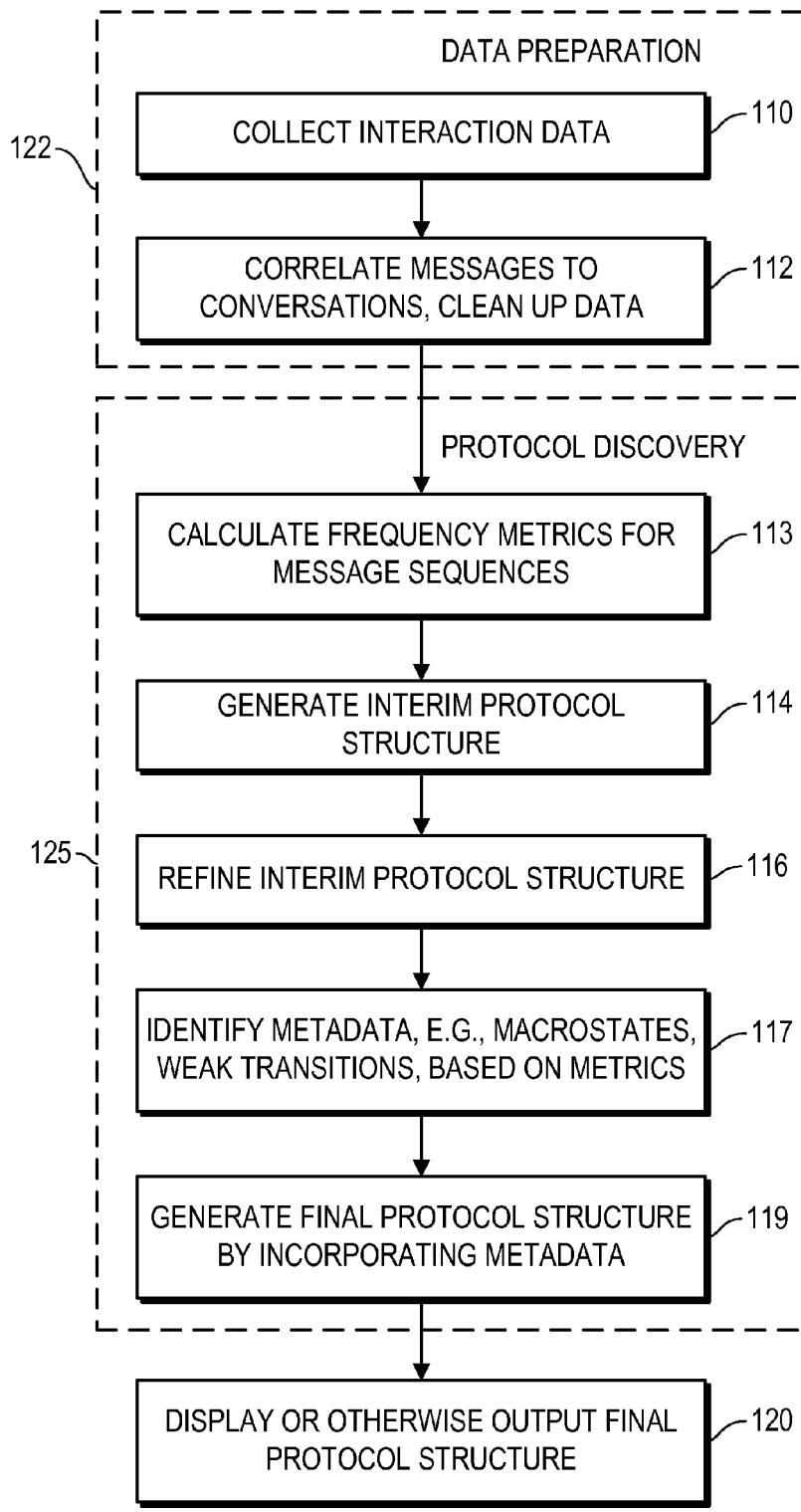
FIG. 6 illustrates a flow diagram for explaining how to generate a protocol structure according to representative embodiments of the present invention.

FIG. 6 illustrates a flow diagram for explaining how to generate a protocol structure according to representative embodiments of the present invention. These techniques are particularly useful for discovering bi-party protocol models (e.g., graphs). The initial portion 122 of the process primarily concerns the collection and preparation of the data to be processed, the second portion 125 primarily concerns the actual protocol discovery and the final step 120 concerns the use of the generated protocol model.

Initially, in step 110 interaction data are collected. Typically, this step is performed by retrieving message logs from the server(s) for the network-provided service.

In this regard, Dustdar et al. have described different ways that service interaction data can be collected. S. Dustdar, R. Gombotz, and K. Baina, "Services interaction mining," Technical Report TUV-1841-2004-16, Technical University of Vienna, September 2004. Depending on how services are implemented and on the type of tools used to monitor service executions, different kinds of information may be included in the server logs, which can make it more or less complex to perform model discovery. In most realistic scenarios, there are three different kinds of information that are included in a conversation log:

Message transfer information (sender, receiver, timestamp);
SOAP message header; and
SOAP body (message content).

In addition, the conversation identifier, which is a way to associate messages belonging to the same conversation, may or may not be present in SOAP messages (header or body).

Depending on the kind of information available, different discovery algorithms can be used and different accuracy levels can be obtained. For example, if message data (SOAP body) is available, then the discovery algorithm is able to perform more advanced processing, e.g., to derive information on data conditions under which a certain path in the protocol is followed. In addition to differences in the information content, logs can differ in accuracy and completeness. In fact, the conversations in the log could be any or all of: noisy, incomplete, insufficient, or irrelevant to the discovery problem. The following list addresses some of these issues in more detail:

Correctness of timing information: depending on how timestamps are collected and conversations are tracked, time measures may be more or less reliable, and timestamps are important to determining the sequencing of events, with incorrect timestamps generating noisy conversations. For example, the logging mechanism may require interceptors that log timestamps but also include a processing overhead. Hence, the timestamp collected is that of the interceptor receiving the message, not the service. In addition, the well-known problems of time synchronization between different servers can affect consistency of timing information collected in different servers. Furthermore, a very common problem is that of timestamp granularity: a coarse granularity (e.g., in increments of one second) can make sequential events look concurrent, where roundoff causes such sequential events to have the same timestamp in the logs. This makes it difficult to establish the correct sequencing.

Sufficiency of information in the log: different services can log a different number of conversations, which might or might not be sufficient to derive protocols. Furthermore, in certain cases few or none of the conversations available in the logs follow a particular path that is in fact available in the protocol; as a result, that path often will remain undiscovered.

Completeness of conversations: There can be errors or interruptions in the services, in the Web services middleware, and/or in the logging infrastructure, resulting in incomplete data about a conversation. In some cases, services abnormally terminate their interactions, leaving incomplete conversations in the log.

Any or all of the above problems can occur in conversation logs. When developing and applying a discovery algorithm, these aspects preferably are taken into account. Very often, implicit assumptions that are made oversimplify the problem and make the proposed technique difficult to apply to real-world scenarios. However, such imperfection is a part of the problem and preferably is considered in the discovery model and algorithm.

Finally, it is noted that different tools generate logs in different formats. As a practical matter, a discovery technique preferably requires logs to be in a homogeneous format, so that the different formats first should be converted into a common format. The present treats this problem as an implementation detail, which, although often quite important, generally is not significantly challenging from a conceptual perspective, as compared to the other issues covered in this disclosure. It generally also is assumed that the semantics of each field logged by the monitoring tools is properly understood, so that it can be correctly converted into the common format.

Although server logs are the preferred source for the interaction data used by the techniques of the present invention, other sources are used in alternate embodiments of the invention. For example, in one such embodiment a potential client or a third party monitors communications across the network among the nodes that participate in the protocol such third party wishes to model. In another embodiment, individual clients attempting to interact with the service report their communications with the service to a central entity, e.g., in a peer-to-peer manner, which central entity then performs the modeling discussed below.

The following discussion emphasizes certain assumptions pertaining to, and certain limitations on, conversation logs and their formats. These assumptions are quite general and as such they typically apply to most 'real life' scenarios. They can be verified whenever Web service interactions are monitored via a Web services monitoring engine, such as the one provided by Hewlett-Packard®.

The input/output and fault messages, which are related to the same operation invocation in a conversation, can be correlated. This assumption generally implies access to the WSDL interface specification for the service corresponding to the data that is being processed.

Timestamps are generated correctly. This assumption typically is realistic in bi-party protocol discovery, as the data usually are gathered from a single server. However, this assumption does not exclude timing issues with respect to a single server, such as the problem of sequential messages having the same timestamp due to granularity issues.

Logs can be incomplete in many ways. For example, some conversations might only be partially logged, and there might only be traces corresponding to the execution of certain paths in the protocol but not others.

In step 112, the individual messages collected in step 110 are correlated with or assigned to conversations, e.g., with each message assigned to a particular conversation. It was noted above that conversation logs sometimes contain conversation identifiers. In this case, it is possible to know precisely to which conversation each exchanged message belongs. Unfortunately, this rarely is the case in real-world applications. In addition, if the logging infrastructure could insert conversation identifiers, it probably also would have some protocol definition, which again is rarely the case.

Therefore, in order to prepare the data for model discovery, the present step 112 maps messages to the conversations to which they belong. There are essentially two general ways in which correlation analysis can be done: purely automatically or at least partially manually. As to the former, it is possible to develop automated techniques that analyze the different messages and determine that certain message elements are important for conversation correlation. For example, one such automated technique identifies: (i) that product number, customer ID, and purchase date identify messages belonging to the same conversation occurring between a customer and the PO service; and (ii) that product number and purchase date could help in identifying the correlation of messages between the customer-PO and the PO-warehouse (in Business Process Execution Language (BPEL) terminology, this is analogous to discovering correlation sets). Such an automated technique can, for example, be created by leveraging approaches in other areas, such as that of record-linkage or entity resolution.

Generally speaking, developing such a fully automated technique would be fairly complex. Fortunately, however, it generally is quite easy for users to manually provide simple input to the discovery tool to overcome much of the complexity. Indeed, an analyst that has knowledge of the service interfaces, or even of the basic functioning of the service, typically would be able to state the criteria to be used for mapping messages to conversations. For example, an analyst generally will be able to provide the sort of information that is required in the above-mentioned example.

It is important to note that even in the manual or partial-manual technique, the user would not be required to actually specify the protocol, but only to provide simple information about, e.g.: (i) which fields are unique during an interaction and (ii) which fields are used to link sub-conversations between two parties. This is information that users typically can very easily specify, given the WSDL interface of a service. Moreover, this approach generally allows for more accurate results as compared with fully automated techniques.

In the following discussion, it is assumed that correlation is done manually or that conversation identifiers are inserted by the logging system, although fully automated correlation also is contemplated. In any event, the resulting effect is that conversation identifiers are present in the log, e.g., a conversation identifier for each message in the log, uniquely identifying the conversation to which it belongs.

In the preferred embodiments, some cleanup of the resulting data log also is performed in this step 112. For example, ordering of messages having the same timestamp (e.g., using predefined rules) is performed. As with the other portions of this step 112, the process is fully automated in certain embodiments and is based on manually specified rules in other embodiments.

At this point in the process, there preferably exists a conversation log defined as follows: a log L is a set of events $e=(cid, s, r, \tau, m)$, where cid is the conversation identifier, s and r denote the sender and the receiver of message m, respectively, and $\tau$ is the timestamp. A conversation c is a sequence $<e_1, e_2, \ldots, e_n>$ such that, for any u, v, $0 \leq u$, $v \leq n$, $e_v.cid = e_u.cid$ (same conversation identifier), $e_u.\tau \leq e_{u+1}.\tau$ (event timestamps define the sequence).

It is noted that conversations define a partition on the log, so that L also can be seen as a set of conversation: $L=\{c_i | 0 \leq i \leq k\}$.

As indicated above, the foregoing steps 110 and 112 together can be thought of as a preprocessing stage 122 that is used to obtain data in the correct format for subsequent processing by the protocol-discovery process 125. Before going into more detail regarding the protocol-discovery process 125, it is noted that the problem the process 125 is trying to solve preferably is not just that of deriving any protocol model that can generate the conversations in L; obtaining such a result would be trivial and generally not particularly useful.

For example, obtaining an arbitrary protocol model would only require creating a model that has a protocol path (sets of states and transitions) for each conversation in the log. However, such a model almost certainly would be completely useless for a user, who would be overwhelmed by the complexity.

Alternatively, another option would be to create a protocol with a single state, that is both initial and final, and that has self-arcs labeled with all the messages in the log. This model is very compact, but allows the generation of virtually any conversation by combining messages in arbitrary ways, and hence very likely allowing the generation of many illegal conversations.

Ideally, the technique should try to create a compact model that allows few or no conversations that are not present in the logs. The specific techniques described below for protocol discovery 125 can be thought of as a hybrid of algorithmic grammar-inference approaches and probabilistic approaches. Such techniques are adapted from a Markov-based method for software process discovery by Cook et. al. J. E. Cook and A. L. Wolf, "Discovering models of software processes from event-based data," ACM TOSEM, 7(3):215-249, 1998. The basic idea of $n^{th}$-order Markov models is to consider sequences of n events to predict the next event. The present discovery processes 125 preferably use the Markov model to identify event sequences (and eventually conversations) with probabilities above a user-defined noise threshold, NT, and then algorithmically build a FSM from these sequences.

This approach, adapted from software-process discovery, is preferred as a starting point in the present techniques as it is parametric (for example in the Markov order, or in setting noise thresholds). Furthermore, such an approach generates a finite state machine as the output model, and it has proven its effectiveness in the area of software-process discovery.

However, the problem of software-process discovery is different from service-protocol discovery in a number of ways. For example: (i) the inputs are different; instead of streams of events, as in the software-process discovery, service-protocol discovery has a set of message sequences encapsulated inside conversations; (ii) service-protocol models typically are deterministic FSMs, while software processes can be non-deterministic; (iii) service-protocol discovery benefits from identifying abstraction that is specific to the discovered protocol models, e.g., the concepts introduced in this disclosure of macrostates, weak transitions and candidate final states; and (iv) ideally, a service-protocol-discovery process preferably enables user feedback, if available, to further drive the process, as discovery from data is almost always an imprecise process. As to the final consideration, the present invention introduces a number of preferences and parameters, often providing a designer with flexibility to tune and guide the discovery process according to the expected complexity of the protocol model, desired level of model compactness, and the amount of information in the log.

As an example, consider a somewhat different PO service than the one discussed above, and assume that one wishes to discover the bi-party protocol presented by such PO service to its clients. A possible conversation starts with an optional request for a catalog (GetCatalog) for an arbitrary number of times and then proceeds with the submittal of a purchase order (SubmitPO). The PO service takes care of shipping the goods, and then directly sends shipping information to its clients. After receiving a purchase order, if the client is a trusted or "gold" customer, the shipping is performed first, and then the client receives an invoice to make the payment. That is, the conversation is: SubmitPO→ShippingInfo→SendInvoice→MakePayment. Otherwise, for regular customers, after receipt of a PO, an invoice is sent, and then only after the payment is made are the goods shipped. That is, the conversation is: SubmitPO→GetInvoice→MakePayment→ShippingInfo. In addition, regular customers can invoke getCatalog many times after receiving an invoice, enabling them to modify the order. For simplicity, other possible order-modification options, as well as other interactions, are excluded from this example. In the following discussion, a shortened name often is used for each message (e.g., Cat instead of GetCatalog, PO instead of SubmitPO, Inv instead of SendInvoice, Ship instead of ShippingInfo, and Pay instead of MakePayment).

A protocol-discovery technique 125 according to the present invention can be implemented as follows. Generally speaking, steps 113, 114 and 116 are adapted and modified from the Markov method for software-process discovery and approaches to grammar inferences, but taking into consideration the additional requirements of protocol discovery discussed above. Steps 117, 119 and 120 primarily are intended to identify specific abstractions of the discovered business-protocols model, e.g., using the concepts of metadata and macrostates.

In step 113, the frequencies of occurrence for individual message sequences within a conversation are determined. Preferably, such frequencies are normalized and expressed as probabilities. More preferably, given the order n of the Markov model, a message-sequence probability table T is constructed by traversing log L and storing the probability that each sequence of length i=2 to n+1 will occur in a conversation. An exemplary portion of such a table T (showing a fragment of a table for taken from a table T that includes 500 conversations with 2 percent noise) is as follows:

| κ | Sequence | Prob. |
|---|---|---|
|   | (Start) → Cat | 0.956 |
| 1 | (Start) → PO | 0.025 |
|   | (Cat → PO) → Cat | 0.096 |
| 2 | (Cat → PO) → Inv | 0.511 |
|   | (Cat → PO → Inv) → Cat | 0.167 |
| 3 | (Cat → PO → Inv) → Pay | 0.397 |

In the above table, the probability of sequence (Cat→PO)→Cat preferably is computed as the number of conversations that have that sequence, divided by the total number of conversations. In the example, for n=3, table T is constructed for sequences of length 4. The rows of the table list sequences of length 1 . . . 3. For instance, for sequence Cat,PO,Inv,Pay, the support of sequences of length 2 to 4 are updated, e.g., (Cat,PO),(Cat,PO,Inv), . . . , (Cat,PO,Inv,Pay). In addition, a virtual message "Start" is added to the beginning of each conversation and the support of message sequences starting with Start are calculated as well. This is because in protocol discovery, the processing is dealing with protocol conversations, not event streams. This will help in step 114 (discussed below).

Figure 7:
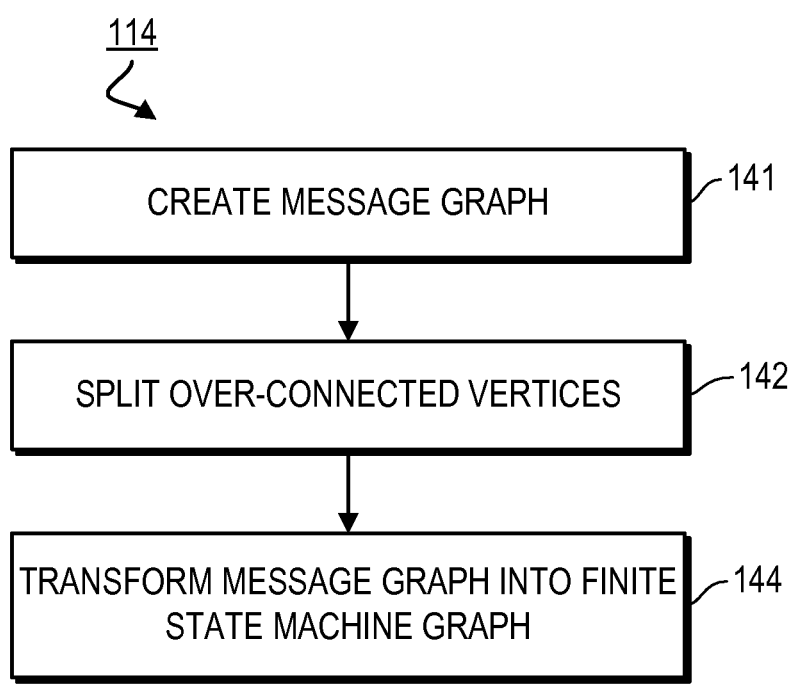
FIG. 7 illustrates a flow diagram for explaining how to generate an interim protocol structure according to representative embodiments of the present invention.

In step 114, an interim protocol structure is generated. The preferred implementation of this step is now discussed with reference to FIG. 7.

Initially, in step 141 a message graph is created based on the frequency metrics calculated in step 113. In this regard, it should be noted that although the term "graph" is used herein, that term is used solely for the purpose of facilitating the understanding of the subject concepts and for permitting easier illustration of such concepts. In fact, although the present invention contemplates displaying actual graphs in certain embodiments, ordinarily the "graph" data referenced herein are stored within a machine-readable data structure that indicates the relationships between the subject data elements. Accordingly, whenever the term "graph" is used herein, any other appropriate type of data structure may be substituted for such term.

Preferably, a directed graph G, called a message graph, is constructed from table T. In such a graph, one vertex is created for each distinct message in the log. For a given order n, and for each sequence of length n+1 in T that exceeds the noise threshold NT, uniquely labeled edges connect each message (which is now a vertex) in the sequence to the immediately following message (vertex) in the graph. For example, for n=3 and for the sequence PO,Inv,Pay,Ship, edges are created from PO to Inv, from Inv to Pay, and from Pay to Ship.

Figure 8:
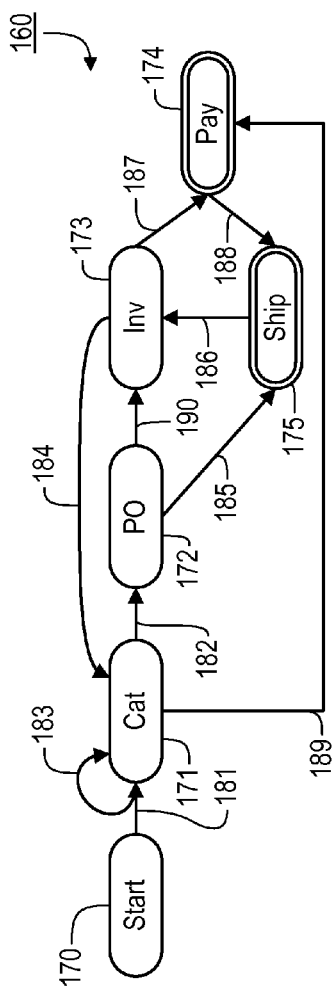
FIG. 8 illustrates an example of a message graph according to a representative embodiment of the present invention.

FIG. 8 illustrates an example of such a message graph 160. As shown, a Start vertex 170 has been added and each distinct message is represented by a different vertex 171-175. Each of the Ship 175 and Pay 174 messages is at least tentatively identified as the final message in a sufficient number of the conversations. Edge 181, for example, indicates that the message Cat 171 was present as the first message in a conversation more frequently than the noise threshold NT. Edge 182 indicates that the message Cat 171 sometimes is followed by message PO 172, while edge 183 indicates that other times the message Cat 171 is followed by another identical Cat message 171. Each of edges 184-190 similarly indicates that a particular message follows another message more frequently than the noise threshold NT.

It is possible, however, that the directed graph created in step 141 (of FIG. 7) might contain over-connected vertices that allow generation of sequences that are illegal, i.e., having a support that is zero, or which is less than the noise threshold NT. This can happen for many reasons. For example, the message graph often will include paths that correspond to the concatenation of multiple separate rows of the table—and hence sequences—but the resulting concatenation itself is not a legal sequence. To correct the graph, in step 142 (of FIG. 7) any over-connected vertices (that is, intermediate vertices in an illegal sequence) are split.

For example, the message graph 160 of FIG. 8 allows generation of the sequence Inv 173, Cat 171, PO 172 from vertex Inv 173. This sequence has a zero probability of occurrence; i.e., it is not present in the table. Hence, the intermediate vertex Cat 171 is over-connected, and should be split into two vertices. When a split happens, arcs also are copied from the original to the split vertex, with the exception of the arc that goes into the final vertex of the illegal sequence.

Figure 9:
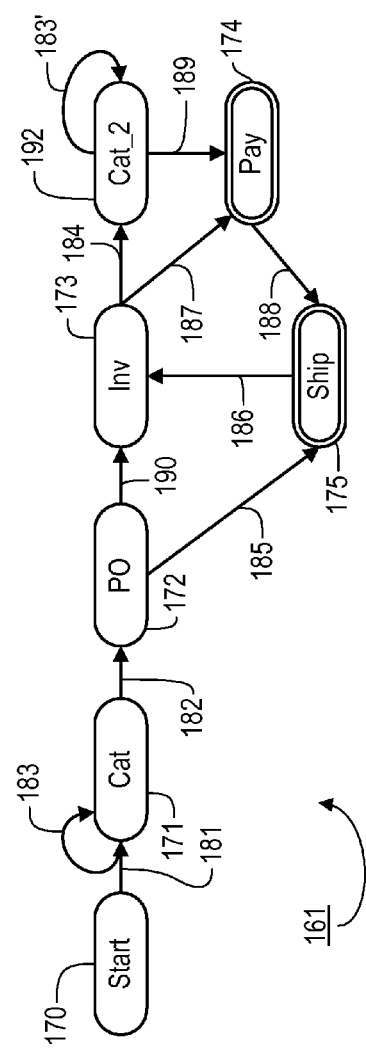
FIG. 9 illustrates an example of a message graph after splitting an over-connected vertex, according to a representative embodiment of the present invention.

FIG. 9 illustrates a modified message graph 161 which results when vertex Cat 171 is split into original vertex Cat 171 and copy Cat_2 192. In the example shown in FIG. 9, there is a transition 184 from Inv 173 to Cat_2 192, and from this vertex 192 there is a transition 183' back to itself, but there is no transition from vertex 192 to PO 172.

To minimize the number of vertices that are split, it generally is preferable to check for over-connection beginning from sequences of length 2 and incrementally increasing the length of sequences checked, as shorter sequences typically cause fewer vertices to be split. The preferred procedure for implementing this approach is as follows:

```
for i = 2..n do
    foreach state vertex v of G do
        IL ← IL ∪ il(v,i+1)
    Prefix ← unique i th-order prefix sequences in IL
    foreach seq ∈ Prefix do
        IE ← all v', (seq, v') ∈ IL
        foreach vertex v of seq[2..i] do
            create v' as copy of v
            copy outgoing edges of v to v'
            remove the edges between copy of seq[i] and the vertices in
IE
        update IL
    remove all of vertices not reachable from the start vertex.
```

In this technique, IL is the list of Illegal Sequences (e.g., with probability below the noise threshold) and il(s,i+1) is the list of illegal sequences of length i+1 that can be generated from v according to graph G. The set Prefix contains all unique prefix sequences of length i in IL. The vertex seq[i] refers to the ith vertex of the sequence seq. IE stands for Illegal Edges, and indicates all vertices for which there is an edge from the vertex seq[i] to them.

Figure 10:
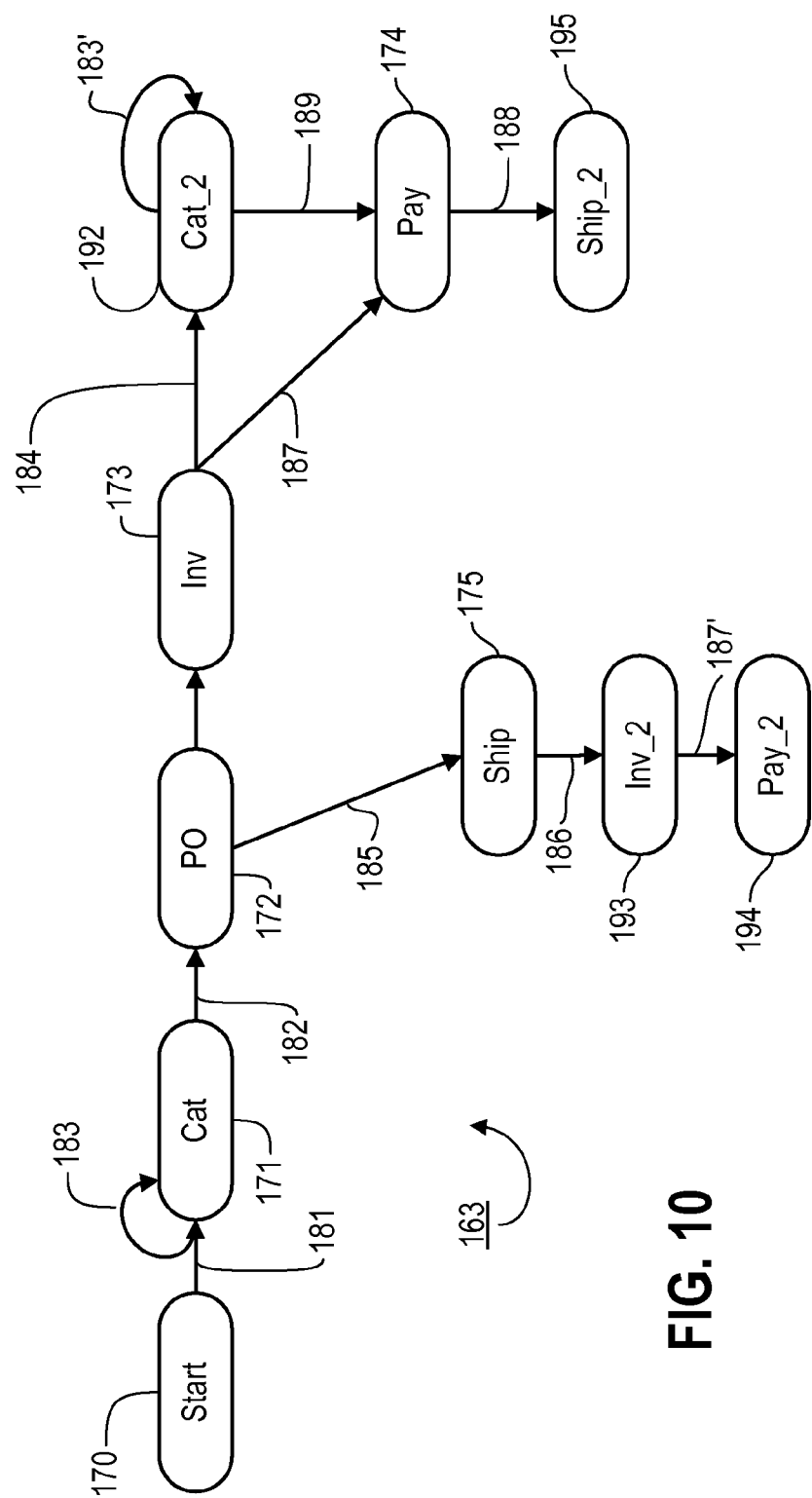
FIG. 10 illustrates an example of a message graph after splitting all over-connected vertices, according to a representative embodiment of the present invention.

Continuing with the example in FIGS. 8 and 9, FIG. 10 shows a modified message graph 163, corresponding to message graph 160 but after all over-connected vertices have been split. More specifically, in FIG. 10, as compared with FIG. 9, Inv vertex 173 has been split to produce Inv_2 vertex 193 (thereby also resulting in a copy of edge 187 as edge 187'), Pay vertex 174 has been split to produce Pay_2 vertex 194, and Ship vertex 175 has been split to produce Ship_2 vertex 195.

Next, referring again to FIG. 7, in step 144 the message graph G output from step 142 is transformed into a state graph, corresponding to a finite state machine (FSM).

In this regard, it is possible to convert the graph G to its dual FSM graph G' in the following way: each edge in G becomes a vertex in G', i.e., a state of the FSM. For each pair consisting of an edge entering and an edge leaving a given vertex in G, a transition is created between corresponding states in G'. This transition is labeled by the name of the vertex (i.e., message) in G. This procedure initially could lead to the production of a non-deterministic FSM, which can then be reduced to a deterministic FSM, e.g., using techniques from the work in finite automata.

However, the preferred embodiments of the invention take an alternative approach of converting the graph G to a dual FSM. Specifically, all edges in G are labeled with the name of the message of their target vertex to obtain G'. For example, all edges to vertex Cat are labeled with Cat. The states in G' are then renamed to some other unique names, e.g., $s_1$ to $s_n$. The resulting graph is a deterministic FSM. In fact, this approach produces the same FSM as the approach described in the preceding paragraph for all cases where the resulting FSM is deterministic. In addition, the number of states typically is fewer than what would be generated by the approach described above. For example, the first approach described above typically generates one additional state for vertices with a self-edge.

Figure 11A:
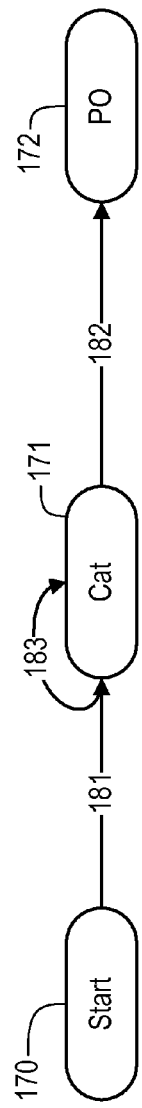
FIG. 11A illustrates a portion of a message graph and FIG. 11B shows how that portion of the message graph is transformed into a state graph, according to a representative embodiment of the present invention.
Figure 11B:
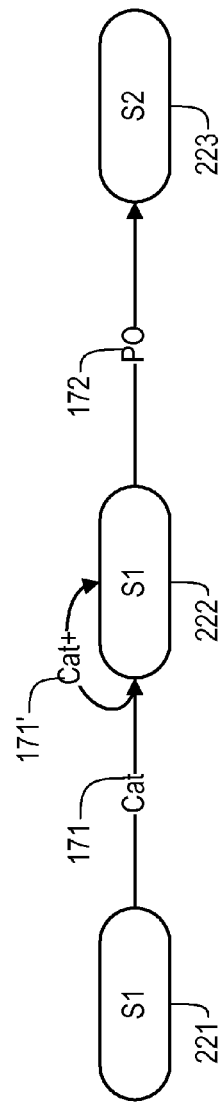

An example of the latter approach is shown in FIGS. 11A and 11B, in which FIG. 11A shows the initial portion of the message graph 163 of FIG. 10, and FIG. 11B shows the portion of a state graph into which that portion of message graph 163 is transformed. As shown, the vertices in FIG. 11B, as compared with those in FIG. 11A, have been renamed to Start 221, S1 222 and S2 223. In addition, the edges in FIG. 11B have been labeled with the name of the message of the target vertex in FIG. 11A. For example, in FIG. 11A the message Cat 171 has two edges coming into it, so those edges are named Cat 171 and Cat+ 171' in FIG. 11B.

The completion of step 144 (in FIG. 7) also completes step 114 (in FIG. 6). Accordingly, upon completion of step 144 processing proceeds to step 116 (again referring to FIG. 6). In step 116, the interim protocol structure generated in step 114 is refined. In the preferred embodiments, this step includes state reduction.

More specifically, the FSM provided by step 114 might contain equivalent states that could be reduced. In the preferred embodiments, these equivalent states are merged. Preferably, the following criteria are applied to find candidate states for merging: (i) states with the same outgoing transitions, i.e., transitions with the same messages to the same target states; (ii) final states with transitions labeled with the same incoming messages, and (iii) states with the same output transitions excluding the transition(s) that go to the other state(s) that are going to be merged with them. Merging of states in situation (iii) above is optional, and the user (or an automated process utilizing the results) preferably is presented with an option to disallow such mergings.

Pre-existing transitions between merged states preferably are represented as self-transitions to the newly created state. To visually differentiate between loops and self-transitions, the latter being allowed only once, a '+' sign is appended to the end of label of all loop transitions in the FSM (e.g., transition Cat 171' in FIG. 11B).

Figure 12:
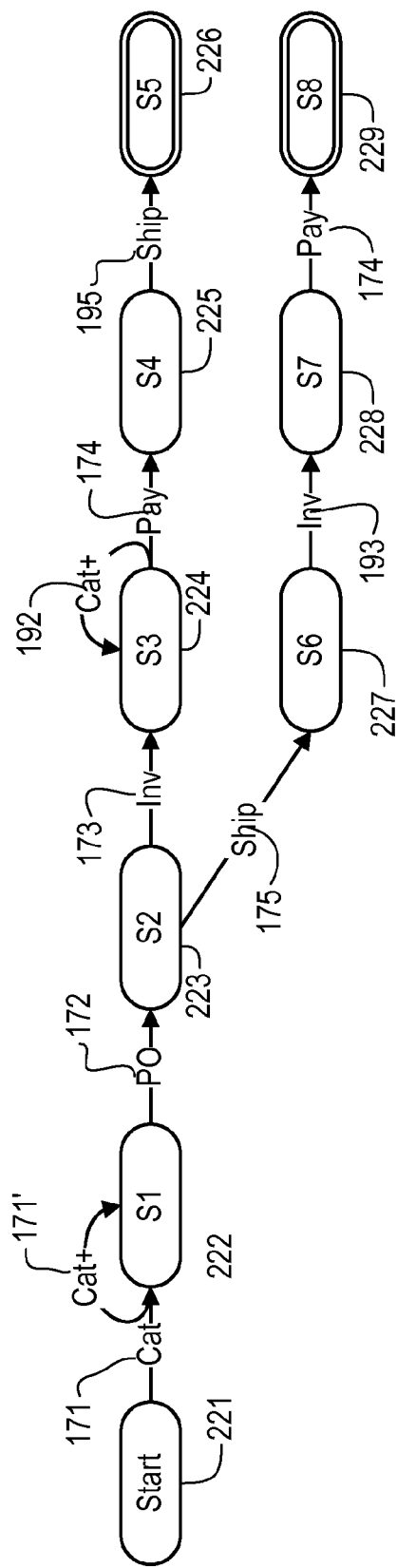
FIG. 12 illustrates a modified protocol structure following reduction of equivalent states, according to a representative embodiment of the present invention.

FIG. 12 shows the modified FSM for the present example through completion of step 116. The generated model, for this example, is exactly the same as its designed protocol model. In FIG. 12, the names of the vertices from FIG. 10 have been applied to the edges of FIG. 12, and the states of FIG. 10 have been labeled S1-S8, 222-229, respectively, with states 173 and 192 from FIG. 10 having been merged into state S3 224 in FIG. 12.

Figure 13:
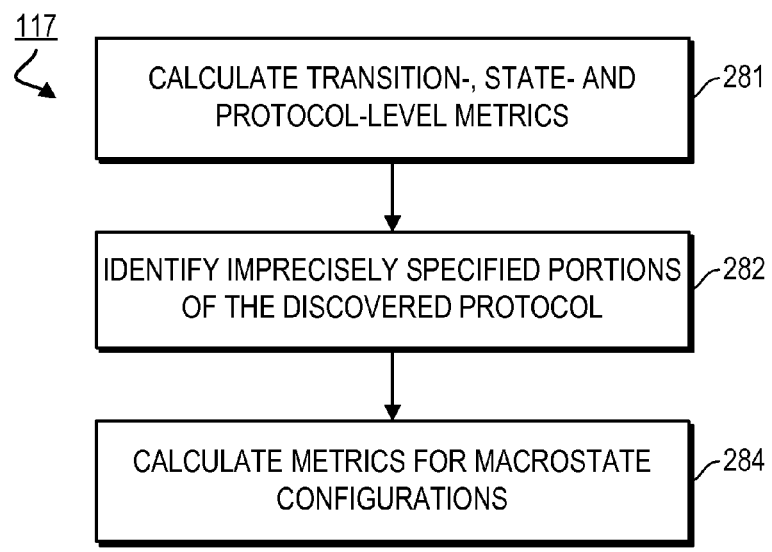
FIG. 13 illustrates a flow diagram for explaining generation of metadata according to a representative embodiment of the present invention.

Next, referring back to FIG. 6, in step 117 various items of metadata are generated based on the frequency metrics calculated in step 113. Representative processing in this regard is now discussed with reference to FIG. 13.

Initially, in step 281 transition-level, state-level and protocol-level metrics are calculated for the discovered protocol P=(S, $s_i$, F, M, T), e.g., by traversing the log of conversations obtained from step 112. More preferably, such calculations are performed as follows:

```
foreach conversation c ∈ L do
    if c is accepted by P then
        s ← s_i
        foreach message m in c do
            t ← (s,s',m) ∈ T
            Supp(t) ← Supp(t)+1
            s ← s'
        FinalSupp(s') ← FinalSupp(s')+1  // here s' ∈ F
        Cov(P) ← Cov(P)+1
foreach s ∈ S do
    foreach t = (s,s',m) ∈ T do
        Conf (t) ← Supp(t)/ Σ_{t∈Out(s)} Supp(t)
```

In the foregoing technique, L is the conversation log and Out(s) represents the set of outgoing transitions from s (i.e. Out(s)={t∈T|t=($s_a$, $s_b$, m), $s_a$=s}). Cov(P) gives the number of conversations that are covered by the discovered protocol model.

Next, in step 282 imprecisely specified portions of the discovered protocol are identified. More preferably, this step takes into account the uncertainty threshold (UT) to identify uncertain macrostates, weak transitions and weak final states. Weak transitions and weak final states ordinarily are easily identified by checking if their support is less than UT. In general, the value of UT will be much larger (e.g., 5 to 10 times) than the noise threshold NT. Using such a threshold has many advantages. First, while the noise threshold is very useful, relying on that measure alone might cause undesired behaviors; setting it to a very small value can introduce a significant number of illegal sequences in the model, thereby making the model complex and, to some extent, incorrect. On the other hand, by setting NT too high some legitimate transitions might be excluded from the model or a partitioned graph might even result.

One idea behind introducing the uncertainty threshold is to allow the use of a small noise threshold, depending on the expected level of noise, and still derive a useful model. In fact, this approach often allows less frequent but legitimate transitions to appear in the protocol model. Parts of the model with low support preferably are represented using the macrostate and weak-transition concepts, so not to exclude them from the model, while simultaneously making the discovery approach more robust with respect to noise.

One technique for finding the set of uncertain macrostates, as described above, is now discussed. This general approach, as well as the specific technique set forth below, often reduces the chance of having disconnected models that could nullify the protocol discovery. Furthermore, a very interesting property of UT is that by setting it to various values, one can in fact set the desired level of abstraction of the final protocol model (i.e., a higher UT typically generates models at higher abstraction levels, that is, with more macrostates). Accordingly, a system of the present invention preferably provides a user interface that allows a user (or an automated process) to select the value of UT.

```
CIS ← set of Candidate Initial States
CIF ← set of Candidate Final States
foreach ($s_i$, $s_f$) ∈ CIS × CIF do
    WP ← set of Weak Paths from $s_i$ to $s_f$
    WPS ← set of states involved in WP
    if ∀seq ∈ WP we have
```

$$\forall s \in \text{seq}, \begin{cases} \forall (s, s', m) \in T, s \in \text{seq} \Rightarrow s' \in \text{seq} \\ \forall (s, s', m) \in T, s' \in \text{seq} \Rightarrow s \in \text{seq} \end{cases}$$

then WP is the set of configurations for a discovered macrostate

In the foregoing technique, first every state of the model is checked to compute candidate initial and candidate final states of uncertain macrostates. A state s∈P is a candidate initial state for an uncertain macrostate if it has more than one outgoing transition and all of its transitions are weakly supported, e.g., having a support less than UT. Conversely, s∈P is a candidate final state for an uncertain macrostate if it has more than one incoming transition, which are all weakly supported. The set of candidate initial and candidate final states are denoted by CIS and CIF in the foregoing technique, respectively. CIS and CIF then are used as filters to limit the number of states that must be checked. In addition, alternate embodiments of the invention use other filtering criteria for this purpose.

When such candidate states have been identified, each corresponding potential macrostate is evaluated to determine whether or not it is an actual uncertain macrostate. In this regard, an uncertain macrostate preferably is defined as a macrostate in which all of the identified configurations have at least one weak transition (e.g., having a support less than UT). However, in alternate embodiments other definitions are used.

Figure 14:
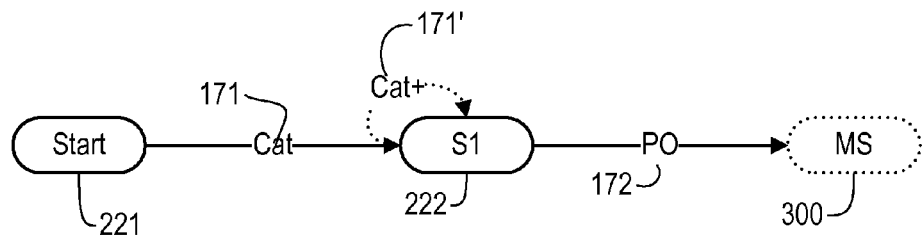
FIG. 14 illustrates a portion of a final protocol structure after identifying weak transitions and macrostates according to a representative embodiment of the present invention.

Without loss of generality, assume that the protocol model of FIG. 12 is a part of a bigger protocol model, in which the support of sequences (Ship,Inv,Pay), and (Inv,Pay,Ship) and (Inv,(Cat),Pay,Ship) are below UT. Consider a path between state S2 223 and final states S5 226 and S8 229. It is noted that, following the rule of merging states with the same outputs, the final states are considered to be the same state. In this case, it is possible to identify the foregoing configurations to be inside an uncertain macrostate. In addition, assume that the Cat+ transition 171' from the state S1 222 to itself in FIG. 12 has a support less than UT. In this case, it is identified as a weak transition and represented differently (e.g., visually, using a dotted line instead of a solid line). The final result for this part of the protocol model is then shown in FIG. 14 in which all of the foregoing structure is replaced with macrostate MS 300 and Cat+ transition 171' is highlighted as a weak transition. As discussed in more detail below, if the macrostate 300 is explored, then the configurations between state S2 223 and final states 55 226 and S8 229 (shown in FIG. 12) are displayed.

Referring again to FIG. 13, in step 282 macrostates were identified. However, in the preferred embodiments of the invention, it generally is not possible to compute the "support" (as defined in the preferred embodiments) of each configuration inside a macrostate based only on the support of individual transitions inside it. Hence, in step 284 the conversations log is traversed once again for the purpose of calculating such support values, which (in addition to the identification of weak transitions, the actual support values for such weak transitions, and the identification of uncertain macrostates) are treated as metadata for purposes of the present invention.

While traversing the log in this round, the technique preferably also discovers the top-K frequent conversations. Discovering the most frequently occurring conversations often can give the designer insights on the ways users are using the service. K preferably is a user-adjustable parameter that is input into the discovery process. For discovering such conversations, the technique preferably maps actual conversations to the discovered business protocol model, filtering conversations with weak transitions from the calculations.

Returning to FIG. 6, having just completed step 117, the process proceeds to step 119 in which the identified metadata are incorporated into the earlier the existing protocol structure in order to generate the final protocol structure. The specific technique for doing so preferably depends upon the specific way in which the protocol structure is represented. For example, in the preferred embodiments weak transitions are highlighted and any uncertain macrostates are identified. For each weak transition, the corresponding calculated support value and confidence value preferably are associated with such transition. For each macrostate, the interior structure and calculated support values and confidence values for configurations within such structure preferably are associated with such macrostate. All of the foregoing metadata preferably is accessible by the user or an automated process receiving the protocol structure. Examples of how such information is accessed are described in connection with the following step.

Lastly, in step 120 the final protocol structure is displayed or otherwise output. In this regard, it often will be desirable to graphically display the final protocol structure that has been identified, e.g., on a computer screen. Doing so often can permit a designer to have a convenient visual representation of the protocols being executed by the subject service.

In such a case, the present invention contemplates an ability for the user to drill down for the purpose of obtaining more detailed information about various aspects of the discovered protocol model. For example, in one representative embodiment by dragging the user's cursor over a weak transition (e.g., designated by a dotted line) the support for that transition automatically is displayed. Similarly, in a representative embodiment, double-clicking on a macrostate (e.g., represented with a dotted-line border and a "MS" label) automatically causes the tentatively identified interior structure of such macrostate to be displayed, either in the same window (e.g., by expanding the macrostate in place) or in a separate window. In another representative embodiment, designating a configuration (or path) through a macrostate (e.g., by sequentially selecting an ordered set of states or by tracing the path with the left mouse button depressed) automatically causes the support for that configuration to be displayed.

As should be readily appreciated, the present invention provides an automated technique for generating a significant portion of a formalized definition for the business protocol supported by a network-provided service. In addition, in representative embodiments of the present invention uncertain portions of the protocol structure (e.g., transitions or macrostates) automatically are highlighted, allowing the designer to easily determine where additional information needs to be provided. Still further, in representative embodiments the initial presentation of a macrostate as an encapsulated node provides a good overview of the more certain portions of the protocol structure, while the provided drill-down capability permits the designer to focus on particular portions of the protocol structure that require additional attention.

As also indicated above, the techniques of the present invention contemplates the use of adjustable settings which can permit customization of the final output protocol structure for various different purposes. One such purpose is to provide a description of an existing network-provided service. Another is to analyze usage patterns in connection with the service. As to the latter purpose, the parameters (e.g., NT and UT) can be selected in order to identify desired analytical information. For example, intermediate values may be selected in an attempt to identify recurring patterns where a conversation was terminated early. Such information might indicate that users have become frustrated with the process or have been prompted for personal information which they are unwilling to provide, thereby signaling that a modification to the protocol design should be considered.

In addition to, or instead of, graphically displaying the discovered protocol model, in representative embodiments of the invention the discovered model is output as a computer data structure for subsequent analysis and/or use by other automated processes. In such a case, the associated data (e.g., overall protocol structure, support values, confidence values, identification of macrostates and interior structure for macrostates) are linked in a logical manner, e.g., using known techniques. For example, such information can be provided to potential clients, allowing them to communicate more effectively with the network-provided service. In exchange, such clients preferably provide feedback communications that, at a minimum, provide information regarding any discovered inconsistencies in the provided protocol model.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

ADDITIONAL CONSIDERATIONS

In certain instances, the foregoing description refers to clicking or double-clicking on user-interface buttons, moving a cursor over particular user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of discovering protocols for a network-provided service, comprising:
    (a) collecting interaction data that pertain to messages between a plurality of devices across a network;
    (b) calculating metrics that indicate frequencies of occurrence for different message sequences within the interaction data;
    (c) generating a protocol structure based on the interaction data and the metrics; and
    (d) outputting the protocol structure, wherein the protocol structure describes permitted conversations for a particular service implemented across the network.

2. A method according to claim 1, wherein the protocol structure includes metadata that indicate uncertainty in a specified portion of the protocol structure.

3. A method according to claim 1, wherein the protocol structure is represented as a finite state machine, including a plurality of states and message-driven transitions between said states.

4. A method according to claim 3, wherein at least one of said message-driven transitions is tagged as being uncertain.

5. A method according to claim 3, wherein said step (c) comprises generating an interim protocol structure and then merging states within the interim protocol structure to obtain the protocol structure.

6. A method according to claim 1, wherein the protocol structure includes a macrostate that identifies a subportion of the protocol structure, including a plurality of states and having a structure that is not known with sufficient certainty.

7. A method according to claim 1, further comprising a step of identifying a group of most-frequent conversations, wherein the conversations correspond to sequences of messages from an initial state to a final state.

8. A method according to claim 1, wherein said step (d) comprises displaying the protocol structure, wherein the protocol structure includes a macrostate that identifies a subportion of the protocol structure, the macrostate including a plurality of states and having a structure that is not known with sufficient certainty, and wherein the displaying of the protocol structure includes a user interface that permits the user to explore structure of the macrostate.

9. A method according to claim 1, wherein said step (c) comprises generating a message graph based on the metrics and then converting the message graph into a state graph representing a finite state machine.

10. A method according to claim 9, wherein the message graph is generated by creating an interim message graph in which each node corresponds to a unique message, identifying an illegal sequence in the interim message graph, and then splitting at least one node into a plurality of nodes to eliminate the illegal sequence.

11. A system for discovering protocols of a network-provided service comprising:
a computer central processing unit to:
(a) collect interaction data from a message log that pertain to messages sent between a plurality of computing devices across a network;
(b) calculate metrics that indicate frequencies of occurrence for different message sequences within the interaction data;
(c) generate a protocol structure based on the interaction data and the metrics; and a graphical display to receive and output the protocol structure,
wherein the protocol structure describes permitted conversations for a particular service implemented across the network.

12. A system according to claim 11, wherein the protocol structure includes metadata that indicate uncertainty in a specified portion of the protocol structure.

13. A system according to claim 11, wherein the protocol structure is represented as a finite state machine, including a plurality of states and message-driven transitions between said states.

14. A system according to claim 13, wherein at least one of said states or said message-driven transitions identified as having support less than an uncertainty threshold is tagged as being uncertain.

15. A system according to claim 11, in which the protocol structure comprises:
(a) a first plurality of elements representing identified states of a network-provided service;
(b) a second plurality of elements representing identified message-driven transitions between said states; and
(c) a tag associated with, and indicating uncertainty in connection with, at least one of said identified states or said identified message-driven transitions.

16. A system according to claim 15, further comprising a metric associated with the tag and indicating a level of uncertainty with respect to said at least one of said identified states or said identified message-driven transitions.

17. A system according to claim 15, wherein the tag identifies a macrostate that identifies a subportion of the data structure, the macrostate including a plurality of states and having a structure that is not known with sufficient certainty.

18. A system according to claim 17, wherein the protocol structure further comprises metrics indicating uncertainty in individual paths through the macrostate.

19. A system according to claim 17, wherein the protocol structure further comprises suspected structure for the macrostate.

20. A system according to claim 15, wherein the tag identifies a transition, and wherein the protocol structure further comprises a metric indicating a level of uncertainty in the transition.

* * * * *